Figure 1:
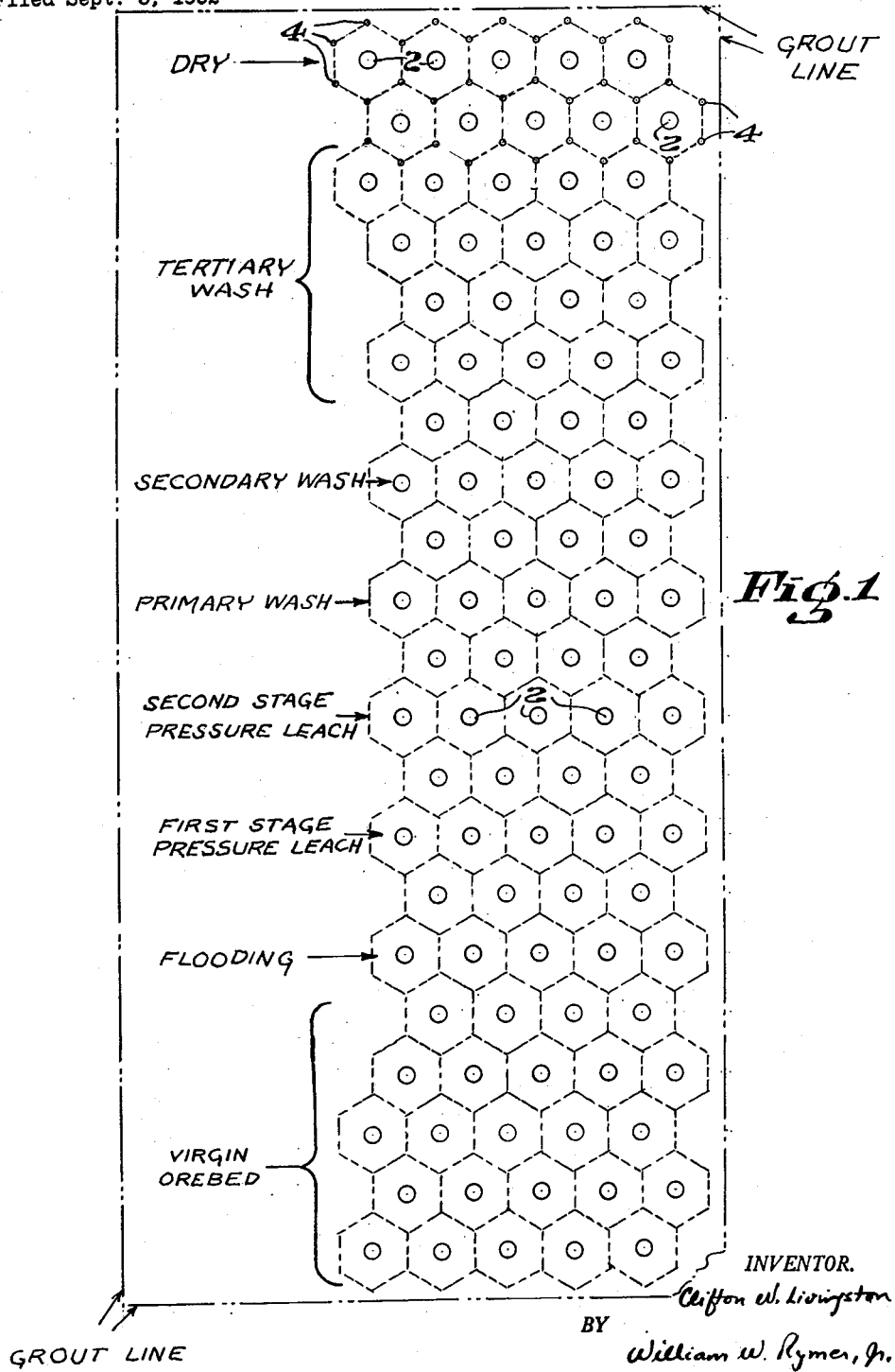

INVENTOR.
Clifton W. Livingston
BY
William W. Rymer, Jr.
ATTORNEY

United States Patent Office 2,818,240
Patented Dec. 31, 1957

2,818,240

METHOD OF MINING ORES IN SITU BY LEACHING

Clifton W. Livingston, Wheatridge, Colo.

Application September 5, 1952, Serial No. 308,040

8 Claims. (Cl. 262—3)

This invention relates to processes for mining by in situ leaching. More particularly, it provides a new method for the leaching and recovery of uranium and related minerals from carnotite-type ores, such as occur throughout the Morrison and Shinarump formations of the Colorado Plateau, which extends over several states, and the Lakota and Dakota formations of South Dakota and Wyoming. This application is a continuation-in-part of my applications No. 229,501, filed June 1, 1951, and No. 271,375, filed February 13, 1952 both now abandoned.

The recovery of metals, particularly uranium, from these orebeds by conventional mining and milling techniques has been extremely costly. The orepods are so small in size, occur in such sporadic and erratic patterns, and contain such low grade ore that mining costs are very high. Remoteness from mills aggravates the expense of transporting large quantities of the low grade ore. And conventional metallurgical methods in the mills have made recovery of the metals from these ores a costly procedure.

I have discovered, however, a method and features which can be utilized to produce with efficiency and economy the desired metals, particularly uranium, from orebodies of even the poor quality described. I achieve this new and desirable result by my novel method for leaching in situ the desired metals from the orebody containing them and for recovering said metals from the resultant solutions.

Although leaching metals from orebodies has been hitherto taught, in a general way, my invention teaches for the first time a method with such features, so integrated, that it makes really practicable the production of metals by in situ leaching and subsequent recovery, particularly the production of uranium and related metals from low-grade depositis. The economy of my new method makes possible for the first time broadening the mined ore zone to include protores.

Among the advantages that characterize my new process, in consequence of the new features I have discovered and the new manner in which I have integrated them, are: unusually low loss of liquid to ground; extremely low loss of dissolved metals and chemicals to ground; extremely thorough removal of metal from the orebed containing it; unusually high concentration of dissolved metals in pregnant solutions entering the recovery steps; and relatively slight loss of water, dissolved metals, and chemicals in the recovery steps. The novel features, materials, and reactions by which I achieve these advantages, as well as the importance of these advantages to the efficient and economical production of metals, will be hereinafter fully described.

Figure 2:
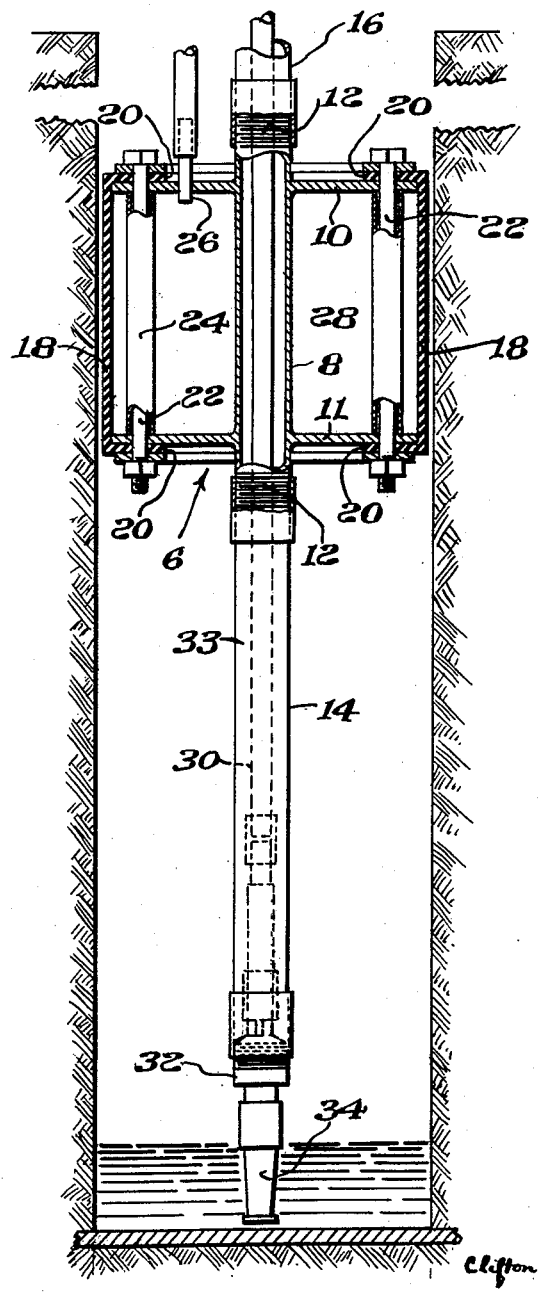

Other advantages and features of the invention will become apparent in the following description and accompanying drawings in which:

Fig. 1 is a diagrammatic representation of the area above an orepod, showing my preferred drilling pattern and the various stages of the leaching process that may be simultaneously in progress; and Fig. 2 is a plan view, partially in section, of a removable packer and certain attachments thereto.

In order to conduct the leaching operation, it is necessary first to determine the character and extent of the orebearing formation: its three-dimensional size and location, its grade and mineral content, its detailed lithology, and the porosity and permeability of it and the material surrounding it. This information, which is obtained by drilling out cores, determines the flow patterns along which the leaching solvents and solutions must be conducted. It also affects, to some extent, the choice of solvents, the order in which they are brought in contact with the orepod, and the lengths of time they are permitted to remain in contact therewith.

It is of course fundamental that in any leaching process it is necessary to first introduce a solvent fluid into a body containing desired solute, and then to withdraw the enriched pregnant solution from said body.

Solvents (and any other desired fluids) may be conveniently introduced into the orepods through holes drilled to connect the orepod either with the surface or with some more conveniently accessible point, e. g., an existing underground development opening. Packers, of any suitable design, may be placed in the holes at the upper level of the orepod, and fluid introduced therethrough.

Fluids may be introduced at any desired pressure (or under no external pressure at all), produced either by static head or through pumping. A limiting factor is that pressure must be kept below the level at which rock failure and vertical ground uplift would occur.

Fluids may be conveniently withdrawn from orepods through the same holes through which they were introduced, or from other, adjacent holes. A vacuum may, if desired, be exerted in the hole to assist in the withdrawal, through packers of any suitable type. These packers should be placed in the holes at the upper level of the orebody.

If desired, however, fluids may instead be withdrawn by allowing them to drain into fissure zones, sheeting zones, joints, or bedding planes and diverting them into suitably placed sumps, ditches, penstocks, or flumes.

In general, it is necessary that the solvent chosen for leaching a particular orebody be capable of extracting the desired mineral without unduly dissolving gangue or in any way clogging the rock pores. In order to meet the latter requirement it is important that the solvent neither contain as introduced contaminants which might clog pores (such as colloidal materials or rust), nor react after introduction to precipitate contaminants that might clog pores.

In practicing my new method I prefer usually to, in essence, introduce a liquid solvent through one hole (of the type described) to the orebed, pass it through the portion of the orebed lying between that well and an adjacent well or hole, and remove it, now enriched with solute, through the latter. This flow may be induced either by introducing the solvent to the input well undei pressure, or pulling a vacuum on the adjacent output well, or as is usually most desirable, both.

It will be apparent that I have stated the above means of flow direction control in its simplest form. My method features inventive new patterns of flow ordering which utilize this means of flow control, among others, in more complex, non-obvious ways, as will hereinafter more fully appear. For example, I may pass solution to a central output well from several input wells grouped around it; or I may use the same hole at different times for both input and output.

I have discovered that raising the pressure differential between adjacent input and output holes (which may of course be accomplished by either raising the pressure at the input wells or increasing the vacuum at output wells, or both, as described) has three major consequences: (1) increased rate of extraction, (2) increased channeling and short-circuiting, and (3) decreased concentration of mineral solute in the solution issuing from the orebed. A fourth consequence results from increased pressure at input wells but is counteracted to some extent by vacuum at output wells: reduced control over the direction of migration of the solution. The first is of course advantageous, while the last three are, because they result respectively in incomplete stripping of ore, increased recovery costs, and loss of solution, disadvantageous.

However, I have discovered not only the relative advantages of higher and lower presence differentials, but I have discovered also that a leaching operation may be conducted so that the advantages of higher differential pressure are in large part achieved without incurring the disadvantages generally resultant from use of such higher differential pressures, and the manner in which I accomplish this is an important feature of my new invention. I have found that if the portion of orebody being treated is first "flooded" with solvent at a relatively low pressure differential until it is saturated therewith substantially complete opening up of the channels containing the desired mineral is accomplished, short-circuiting and channeling being substantially eliminated. Further solvent may then be passed through that portion of orebed at a higher differential pressure, and the mineral remaining in the partially opened up channels thus rapidly extracted therefrom.

The pressure differential required to "flood" at any particular rate, or to "pressure-leach" at any particular rate, increases with increased distance between output holes but decreases with increased orebed permeability and increased dissolving-power of the solvent used. Conversely, factors that determine how far apart the holes must be drilled are (1) the time allowable for the "flooding" and "pressure-leaching" steps, (2) orebed permeability, and (3) dissolving power of solvent. For example, with a pressure differential of 50 p. s. i. between input wells and output wells, orebed that may be "flooded" in seven days if the wells are 20 feet apart requires as much as twenty-seven days for flooding if the drill holes are 40 feet apart.

The "flooding" step is desirably carried out at the lowest pressure differential at which solvent can, in a practical way, be brought in contact with the orebed, while the "pressure-leaching" step is desirably carried out at a substantially higher pressure, any pressure below that at which rock failure (with vertical ground uplift) would take place being suitable. In my preferred embodiment of the process, pressure at the input wells during flooding is only that due to gravity: i. e., the head of a column of solvent extending from the orebed to the ground surface. In the pressure-leaching step, additional pressure is impressed at the input wells, preferably by means of suitable pumps.

I have found that it is desirable to maintain a vacuum at the output wells during both flooding and pressure-leaching, in order to draw the fluid in the desired direction and help minimize undesirable migration.

A particularly suitable way to maintain this vacuum at the output wells is, I have discovered, to recirculate through a venturi solution like that being withdrawn. Dilution is thereby avoided, except during starting-up operations.

Because my method involves drilling a large number of wells, I have found it desirable and economical to seal the drill holes with removable packers, so that when operations are complete at any particular well the packer therein may be removed and placed in another well.

A preferred embodiment of a removable packer that I have discovered is shown in Fig. 2. The embodiment shown is particularly designed for use in output wells. The body 6 of the packer is formed of a length of pipe 8 around which two spaced-apart rings 10 and 11 are attached, by welding in the embodiment shown, in such a manner as to preclude leakage between the pipe and these rings. Provision is made at each end of the pipe 8, as by the threads 12, for joining said pipe to other lengths of pipe 14 and 16 of the same diameter. A sleeve 18 of a suitable flexible material, such as rubber, having lips 20 at the top and bottom thereof, is fitted over the rings 10 and 11 in the manner shown, and attached thereto by bolts 22 which pass through registering holes around the peripheries of the two lips 20 and the two rings 10 and 11. Around the bolts 22 and between the rings 10 and 11 are placed lengths of tubing, of suitable diameter, to give added support to the rings 10 when the bolts 22 are tightened. A pipe 26 leading into the annular chamber 28 is passed through ring 10, and welded or otherwise joined thereto in an airtight manner. The pipe 26 is connected to a source of air pressure.

A smaller pipe 30 extends down through pipes 16, 8, and 14, supported in any suitable manner. The pipe 30 is joined, through suitable connections, to the output side of a suitable ejector 32, to the input side of which the annular space 33 between the pipe 30 and pipes 16, 8, and 14 is connected. A vacuum is pulled, by the fluid movement through the ejector 32, on the nozzle 34, which extends substantially to the bottom of the well being pumped out.

In operation, the packer is lowered into a well to the desired depth, compressed air is then introduced through pipe 26 until sufficient pressure is built up in the cavity 28 to expand and hold the sleeve 18 firmly against the surrounding wall 8 of the well, and then fluid (preferably of the type being removed, to prevent dilution) is introduced through the annular space 33 into and through the ejector 32. The vacuum created by the ejector 32 draws fluid from the well through the nozzle 34, and this fluid, together with that entering the ejector 32, passes out through the pipe 30. When it is desired to remove the packer, this may be done after releasing the air pressure within the chamber 28.

The two step ("flooding" and then "pressure leaching") process has several advantages in addition to those already described. It permits using a solution of greater dissolving power during the first step, when the amount of ore to be dissolved is greater. A solution of as high dissolving power as can be practically achieved should be used in the flooding step for the additional reasons that it is desirable to open up as many channels and pores in the rock as possible, and obtain an effluent of high mineral content so as to cut the expense of recovering it from solution. This greater dissolving power may be achieved by changing the composition of the solvent or by raising its temperature, if this is convenient, or both.

Another new feature of my process is based on my discovery that most thorough contact between solvent and ore, with consequent minimization of channeling and short-circuiting and maximization of orebed stripping, is accomplished if solvent is made to pass between each pair of adjacent input wells and output wells in both directions, not simply by forcing in through and then drawing back out through one of the holes, but rather by forcing solution in at each of them and making it flow through the portion of orebed between them to the other one. In this manner rock channels that are short-circuited, even with cautious unidirectional "flooding," may be opened up because, owing to peculiarities of rock structure, much more easily penetrated by solvent cutting its own path from a second, opposite direction from that of initial flow.

It will be apparent that introducing solvent through one hole, forcing it through to the other, and then drawing it back out the first would not have the same effect. There the tendency would be for the solvent to take its first-formed routes back to the original hole rather than eat out new ones.

It will be apparent that here again the leaching patterns in which I apply my two-way-flow principle just described are much more complex than the simple two hole pattern I have referred to to facilitate description. For example, flow may be back and forth between one output well and a group of input wells disposed around it. And, instead of using all wells as both output and input wells, I may use some wells as input wells only. Thus, I may introduce solution through one well, pass it through the orebed until it appears at the adjacent well (which appearance may be manifested by an electrical cirucit's being completed by the solution, or in any suitable manner), and then pass solvent into the latter well, through the orebed, and out the first well, at the same time withdrawing therefrom the solvent first introduced, so that the second well is never used as an output well. Also, I may introduce solvent from the two directions simultaneously rather than successively.

Normally I will carry out my two-way-flow operation as part of the "flooding" step, described above. However, I may sometimes vary this by "flooding" in the first direction, and then "pressure-leaching" in the opposite direction.

It will be apparent that a very important feature of my new process is its novel method of producing thorough contact of solvent with, and therefore thorough stripping of mineral from, the pores throughout the orebed, with a minimum of channelling and cross-circuiting. In addition to the two-way-flow step, the step of initially flooding at low pressures, and with a solvent of high dissolving power, as well as the steps taken to control direction of solution flow, contribute to this desirable result.

Another feature of my new leaching method is a new overall drill hole pattern that I have discovered, which not only facilitates practice of the principles I have already described above, but incorporates additional important advantages, as follows.

I have found that it is often desirable that output wells be larger than input wells need be. Larger output wells store more solution, so that continuous and more efficient pumping of solution from them is possible. They also, because of their greater surface area, increase flow rate of solution into them and diminish loss of solution due to undesired migration. On the other hand, larger holes are much more expensive to drill. The new overall drill pattern I have discovered has the advantage that only a small fraction of the holes drilled need be used as output wells, so that the advantages of having output wells of a larger size can be obtained without excessive expense. This pattern is also useful even if it is desired to use output wells and input wells of the same diameter.

Essentially, as is shown in Fig. 1, my new overall drill pattern is made up of rows of the larger output holes or wells 2, which may be 2" to 36" in diameter, each output hole having disposed around it a multiplicity of input wells 4, which may be 1¼" to 2½" in diameter; typically, thus, by rows of polygons. In an especially suitable arrangement, six input wells 4 are provided, in a regular hexagonal pattern, around each output well 2, each output well 2 sharing with each adjacent output well 2 two input wells 4 (which define a common side of the input-well hexagons surrounding the adjacent output wells).

A further advantage of grouping several input wells around an output well is that because each output well is supplied by several input wells flow into the output wells is faster and more constant, and this increases still further the efficiency with which solution may be pumped from the output wells.

A factor that must be taken into consideration in determining distances between output and input wells is the character of the surface underneath the orebed. If it is a corrugated formation (e. g., a corrugated, rubbery shale), the holes must be spaced close enough together so that some of the output wells in the overall pattern will be in each "valley" of the corrugated substratum. Otherwise, there would be excessive liquid loss through accumulation in "valleys" from which it could not be withdrawn.

I have already referred to the fact that it is of the greatest importance to avoid loss of solvents and other fluids to the formations, which are usually very porous. One reason is that the fluid itself is usually expensive to replace. In leaching uranium from orepods in the arid Colorado plateau, for example, the necessary water is scarce and expensive. Another reason is of course that to the extent fluids lost contain dissolved chemicals or minerals, these too are lost. It is an essential of a practical leaching process, thus, that undesired fluid migration be severely restricted. My new process achieves this desirable result through application and integration of several principles I have discovered. I have already had reference to two techniques which contribute to control of the directions of flow of fluids in my process and limit undesirable migration: the use of a vacuum at output wells to draw fluid toward them, and the use of output wells of larger diameter and thus greater internal surface area. Also contributing to this flow direction control is my two-way-flow operation, which I have already described. When leaching has first been done from one hole in the direction of a second, there is a strong tendency, when the direction of flow in reversed, for fluid to travel toward the first hole without undesirable migration, even though it opens up a substantial number of new channels and pores between the two holes. Another factor that may contribute to flow direction control is gravity: whenever the orebody is not on a level, the drill and leaching patterns are oriented so that the direction that flow generally is desired to take is downhill.

It is also desirable to erect positive barriers to fluid migration, both lateral or vertical, from within the orebody being leached.

One useful means of limiting migration is by producing, through grouting, impervious curtains around the orebody. A lateral grout curtain may be formed by introducing a grout substance into holes drilled at suitable locations around the orepod. The grouting must fulfill two functions: (1) filling of joints and open fissures, and (2) reducing permeability of the rock mass by filling its pores. Generally a cement or cement slime grout is used to fill joints and fissures, and a colloidal or plastic substance, gel, or chemical grout is used to fill rock pores. Both the location of and the material introduced through particular holes is thus determined by whether it is meant to serve one or the other, or both of these functions. Grouting is preferably introduced along natural joints in the rock formation, since in this way a curtain may be formed using a minimum quantity of grouting material.

In order for any leaching process to be successful in practice, it is necessary that loss to the orebed of dissolved minerals and chemicals be kept at a minimum; that a high degree of stripping the orebed of the desired mineral be achieved in extraction; and that to make for efficient recovery and decrease fluid handling, the concentration of dissolved mineral in solutions going to the recovery system be kept at a high level. My new process provides for accomplishing, at the same time, all these important objectives. This it does through the novel and inventive sequence in which different solvents and fluids are passed through each portion of the orebed treated.

I have already described the advantages that accrue from first "flooding" a particular portion of orebed and then "pressure-leaching" it. I have also pointed out that (because the content of desired mineral is high when it is exposed to this first extraction step, because substantially all mineral-containing channels should be opened up in this step, and because a pregnant solution rich in minerals cuts costs in the precipitation steps), a solvent of high dissolving power should be used for flooding.

It would be possible to conduct pressure-leaching by then passing through the orebed portion more of the same solvent. In my preferred embodiment of my new process, however, I subject the portion of orebed to two successive pressure-leaching stages. It is first pressure-leached with solution that has already passed through another portion of the orebed, and so carries some dissolved mineral. In the second stage it is pressure-leached with a fresh leaching solution, which may suitably be of substantially the same composition as that used for "flooding." The solution that results from this stage is then used to carry out the first stage of pressure-leaching of another portion of the orebody.

It will be apparent that in my conduct of the pressure-leaching step I bring ore that is richer in mineral content in contact with solution already containing some dissolved mineral, and ore of least mineral content in contact with fresh solvent. Thus in the first stage of pressure leaching I enrich the mineral content of the pregnant solution at the expense of ore higher in mineral content; while in the second stage I strip the remaining, harder to extract, mineral content with fresh solvent. Further, because the solution resulting from the second stage of pressure-leaching has a much lower dissolved mineral content than that resulting from the first, the quantity of dissolved minerals contained in the liquid trapped in the orebed is greatly reduced. (As already described, a certain fraction of whatever liquid is inside the orebody is trapped in corrugation valleys from which it cannot be withdrawn by pumping. In addition, further liquid is retained in the wetted pores throughout the orebody.)

A further feature of my preferred embodiment is based on my discovery that loss of dissolved minerals to the orebody through inevitable trapping of liquid already described can be still further diminished by incorporating a washing step in my new process. This step has the further advantage of minimizing in the same way the loss of dissolved chemicals.

Washing may be carried out in one, or two, or other number of stages, the number of stages being governed by the value of solutes recovered as compared with pumping costs. Wash in any particular stage may be recirculated through the orebody portion it is washing, if desired. I have found that subjecting each portion of orebody to a three-stage washing step is very satisfactory. Fresh water (or other wash material) is passed through a portion of orebody in the third or final stage; the resultant liquid is then passed through another portion of orebody as the second stage of washing for that portion of orebody; and the then-resultant liquid is passed through a third portion of orebody as that portion's first stage of washing. In other words, a particular portion of orebody is washed: first, by liquid that has passed through two other portions of orebody; second, by liquid that has washed one other portion of orebody; and finally with fresh water. In this manner the solute content of the liquid trapped in a particular portion of orebed is successively reduced by exposure to constantly purer water; while at the same time the solute content of any particular batch of wash is constantly raised by exposure to successively more solute-rich bed portions.

In the course of flooding, pressure-leaching, and washing, some fluids are drawn up through the bed above the orepod by capillary action. I have found that, in order to prevent loss of dissolved minerals and chemicals through this effect, it is desirable to remove the packers from the wells before introducing the final wash (the third wash, in my preferred embodiment). The wash is thus introduced to the bed at all levels above the ore body that have been welled previously, and as it is withdrawn it washes down the dissolved material in the fluid lifted above the orebody by capillary action.

In addition to providing maximum washing with minimum water supply and handling requirements, this stage-by-stage enrichment of wash water has further significance in my new leaching process. I use the solution emerging from its third trip through the bed to "make-up" fresh leaching solution of full dissolving power, by adding to the chemical already present the amount required to produce full strength. This solution I may use either in flooding or in pressure-leaching.

It will be observed that, when I use this "make-up" solution for pressure-leaching, as I do in my preferred embodiment of the process, I successively increase the content of mineral solute in a single mass of fluid through five successive passes of it through different portions of the bed; while successively decreasing the mineral content of a single portion of the bed by passing through it five successive masses of differently composed fluid.

I have also discovered that it is desirable, if possible, to conduct the recovery part of the process in such a way that the chemical solvent is either left in the solution from which the mineral has been separated, or may be regenerated in it without undue expense. After addition of further chemicals, if necessary, to bring it up to full dissolving power, this solution may then be used in either the flooding or the pressure-leaching step of my new leaching process. This has two advantages: it eliminates loss not only of chemical solvent, but of whatever mineral solute remains unremoved as well.

Thus it will be seen that in my new process there is a complex integration of many features and steps, all of which unite to minimize loss of solutes, chemical as well as mineral; to strip the orebed thoroughly; to build up mineral content of solutions sent to the recovery step; and to minimize solution loss both within the orebed and in the recovery step.

In conducting the successive stages of flooding, pressure-leaching, and washing, it is usually desirable to have different stages in progress in different portions of the bed, at the same time.

In the row-of-polygons overall drill pattern that I have already described, flooding may be in progress in one row, the first stage of pressure-leaching in the next adjacent row (in the direction opposite that of the virgin orebed), and then the second stage of pressure-leaching and the first, second, and third stages of washing in the respective next four adjacent rows in the same direction. As each set of treatments is completed, the whole arrangement may be advanced one row in the direction of the virgin orebed, the portion of orebed formerly being flooded now being subjected to the first stage of pressure-leaching, and so on.

In my preferred embodiment of the process, however, I have found it desirable to leave between each row of polygons being treated a row temporarily receiving no treatment. This inter-position of space barriers between rows being treated has the advantage of minimizing dilution of stronger solutions by weaker solutions in an adjacent row through mingling. Advance is still in the same direction, and still one row at a time. Each row that is idle during one set of treatments is thus under treatment the next, and vice versa.

It will be apparent that the concentric-circles drill pattern which I have already described may also be operated in this manner, interposing space barriers between annular rings being treated. It is usually better to start flooding at the center hole and advance toward the periphery of the orebed, though it is possible to start leaching around the periphery and advance ring-by-ring to the center.

Use of the concentric-circle pattern has an advantage that may make it the preferred pattern when simultaneous flooding of a new portion of the orebed and pressure-leaching of a portion just flooded is regarded as desirable. It will be apparent that solvent may be introduced at any ring of holes and drawn through the portions of orebed separating this ring and both concentric rings of holes adjacent to it. If in the previous step one of these portions was flooded and the other was as yet untreated, the former portion is now being pressure-leached while the fresh one is being flooded. The proceeding may advance from ring to ring in the direction of virgin orebody, in the manner already described. Of course, simultaneous flooding and pressure-leaching of adjacent areas cannot be carried out with a space barrier (a temporarily idle area) between the portions of orebody being, respectively, flooded and pressure-leached at the same time. However, space barriers can of course, if desired, be used between all other pairs of successive stages being simultaneously conducted.

As has been explained, any given quantity of fresh water entering my process is, in my preferred embodiment thereof, used first as tertiary wash, then as secondary wash, then as primary wash, then (after chemicals are added as required to bring it up to the solvency strength desired) as second stage pressure leach, then (after a similar replenishment of chemical to restore solvent power) as first stage pressure leach. The mineral content of the now-pregnant solution is recovered, as by precipitation, and the barren solution remaining is used, after replenishing and, if necessary, regenerating the solvent chemicals, as a flooding solution. The pregnant solution resulting from the flooding step is treated to recover the desired mineral and the barren solution remaining is again used, in the manner already described. It will be apparent that to the extent fresh water is added in the final washing step, the total liquid present in the system is increased, except for losses to the rock formation, and this increase takes the form of a constant build-up of barren solution. In order to maintain an overall liquid balance, therefore, it is desirable to return excess barren solution (suitably replenished and, if necessary, regenerated) to the second stage of pressure-leaching, to be mixed with fresh makeup leaching solution and thereby diminish the quantity of the latter solution needed for pressure-leaching. The amount of water added to the system as fresh wash will then equal the amount ultimately needed to prepare fresh makeup leaching solution, which in turn will, at overall equilibrium, equal the quantity of water lost to the rock formation.

It will be apparent that large portions of the orebed may be left saturated with the tertiary wash as long as desired, the resultant liquid being withdrawn as needed by the rest of the system. The already-leached portion of the bed may desirably serve, thus, in effect, as a storage tank for water to be needed in the process. This "tank" has the additional advantage of preventing back-flow of other solutions.

Tertiary wash is removed by imposing vacuum on the output wells in the portion of the orebed subjected thereto until drainage is as complete as is practicable. Optimum drainage may be achieved by injecting compressed air into input wells, either throughout the drainage period or after substantial drainage has been produced through use of vacuum alone.

If desired, thorough drainage could be accomplished after each step or stage of the process: flooding, pressure-leaching, and earlier washes as well as final wash. In my preferred embodiment, however, I cut pumping costs by leaving each portion of orebed undrained after each of the process stages other than the final wash. Each portion of orebed is thus left saturated, between treatments, with the solution of the preceding stage. This has the further advantages of (1) increasing the contact time between solutions and orebed, and (2) when "space barriers" are left between portions of orebed undergoing different stages of treatment (as in my preferred embodiment of the process, as described above), of providing a positive barrier to fluid migration between portions of orebed currently under treatment and the mingling that would result therefrom.

If it is desired to increase the pressure in the saturated, temporarily not under active treatment, portions of orebed serving as 'space barriers," this may be done by imposing air or other gas pressure at the wells in said portions.

Having now described my new process for leaching minerals in situ, I will describe my preferred embodiment thereof as applied in my new process for the mining and recovery of uranium, vanadium, and radium from ores containing the same.

After exploratory drilling to determine the character and extent of the orebody, as described, I surround the orebody, except along any uphill side, with a grout curtain of the character described, extending in depth to the relatively impervious shale underlying said orebody. If no impervious stratum underlies the orebody it is necessary to provide one by grouting, as described. I then drill a row of output wells just inside the vertical grout curtains, to serve as a vacuum drainage curtain, in the manner described.

Next I drill input and output wells, in the "hexagonal rows" pattern I have described, orienting the pattern both to the location of the grout curtains and so that any corrugations in the stratum underlying the orebody have output wells extending into the valleys thereof, as described.

I then subject these rows of output wells (each output well being surrounded by a hexagonal pattern of input wells) to the succession of flooding step, pressure-leaching step (in two stages), and washing step (in three stages), all as already described as my preferred embodmient of the leaching process.

Each row of hexagons is flooded, as the advance goes forward, by introducing solution (of the character described below) at the center holes until it appears at the holes around the peripheries thereof; then introducing more of said solution at the holes around the peripheries and at the same time evacuating it from the center holes.

In the stages of the pressure-leaching and washing steps that follow, the relevant liquid is introduced in each case at the holes around the peripheries and evacuated from the center holes.

Because it is desirable to precipitate uranium, ultimately, from solutions substantially free from calcium, magnesium, and aluminum, it is desirable to pre-treat the water to be used in the leaching steps, to remove these impurities, by any suitable technique. Although some quantity of these impurities will usually be picked up during the leaching steps, removal by adsorption on alumina will be considerably less of a task, and cause much less poisoning of alumina, than would be the case without the pre-treatment.

For flooding, I have discovered that an especially suitable solution contains, by weight, 5% to 14% of $Na_2CO_3$, approximately 2% $NaHCO_3$, and approximately 5% NaCl. To increase its solvent-power, I elevate the temperature of this solution as much as is practical with by-product heat from the recirculating pumps and the recovery plant.

I include $NaHCO_3$ because I have discovered that so long as some of it is present in the solution, the solubility of uranium compound, usually $U_3O_8$, is greatly increased.

My reasons for including as much as 2% $NaHCO_3$, however, derive in part from another discovery I have made. I have discovered that $U_3O_8$ as found in the orebodies is usually associated with or attached to carbonaceous material: asphalts, lignite, or old bits of former twigs or leaves. Most of the uranium compound lies on the surface of the carbonaceous material and can be dissolved from it without undue difficulty. In order to get the remainder of the uranium, however, it is desirable to remove the carboniferous material which brings with it the most intimately associated uranium compound. I have discovered further that the more basic the leaching solution used (i. e., the higher its pH) the greater the amount of carbonaceous material extracted. I have discovered further, however, that presence of carbonaceous material in the solution greatly inhibits the precipitation of uranium (as sodium uranate) on addition of NaOH, and therefore it is necessary to "polish" most of the carbonaceous material from the solution before precipitation of the sodiumuranate.

Because most of the $U_3O_8$ can be leached out without removing substantially the carbonaceous material, and because it is desirable to minimize the quantity of solution requiring substantial "polishing" out of carbonaceous material to get it in readiness for the precipitation step, I have discovered that it is desirable to leach first with a solution of as low pH as is consistent with high dissolving power (the latter being needed, particularly during flooding, for reasons already set forth) until substantially all the $U_3O_8$ which can be obtained without removing carbonaceous material is leached out; and then to carry out the leaching necessary to remove the $U_3O_8$ remaining behind and its associated carbonaceous material with solution of a higher pH. I normally flood with solution of lower pH, so that during flooding extraction of carbonaceous material is suppressed, and then accelerate extraction thereof during the pressure-leaching step, by pressure-leaching with a solution of higher pH.

The use of more than just a slight excess of $NaHCO_3$ has the advantage not only of insuring that some $NaHCO_3$ is present in the solution at all times, but also of lowering the pH of the solution (assuming 10% $Na_2CO_3$, the proportion I prefer, is used) from 9.9 to 9.6.

The NaCl I add has the effect of further reducing the pH to 9.3, and one reason I include it is to obtain this effect. Far more carbonaceous material is leached out by solution at pH 9.9 (10% $Na_2CO_3$ solution) than by the solution of pH 9.3 that I use during the initial phase of leaching.

The second reason for including NaCl in the solution is to promote the extraction of radium, which is present to a significant extent in many orebodies containing $U_3O_8$. Most of the radium in effluent solutions is present in slimes released from the orebody by the solutions.

The pregnant solution that results from the flooding step contains slime derived from the clay cement present in the standstone containing the orebody and is pumped into storage tanks into which are dipped filter leaves. Part of the slimes present, which are rich not only in radium but in vanadium as well, settle out, and may later be treated as desired to recover their valuable components. The remainder of the slimes accumulate on the filter leaves, through which the pregnant solution is filtered. A property of the natural slimes of the Morrison formation is the ability to adsorb carbonaceous material.

An additional advantage of this filtration method is that much of the carbonaceous material that is present in this pregnant solution (despite the relatively low pH maintained during flooding) is adsorbed by the coating of slime that accumulates on the filter leaves. In the absence of a naturally occurring slime component (such as is present in association with carnotite-type ores of the Morrison formation) in the pregnant solution, a suitable filter aid material may be used to adsorb carbonaceous material. Various types of bentonite, bentonitic clays, activated charcoal, and activated alumina are suitable adsorbents for carbonaceous material.

The solutions emerging from each of the two stages of the pressure-leaching step and from each of the three stages of the washing step are similarly subjected to settling and filtration in order to separate out any slimes present and as much carbonaceous material as may be.

The solution I prefer to use in the two stages of the pressure-leaching step, to accelerate extraction of carbonaceous material, contains 10% $Na_2CO_3$ (though I have found any concentration between 5% and 14% very satisfactory), and a slight percentage of $NaHCO_3$—say 0.2%. Usually, commercial soda ash contains sufficient $NaHCO_3$ to provide the excess required. Although $NaHCO_3$ depresses pH to some extent, which is undesirable if maximum carbonaceous material is to be leached out, the presence of some $NaHCO_3$ in the solution is of such importance to the solubility of $U_3O_8$ that it is not practical to eliminate it. Solution that has already been used in the second stage of pressure-leaching (any particular portion of orebody) is built up to the above concentrations of $Na_2CO_3$ and $NaHCO_3$ before it is used in the first stage of pressure-leaching (another portion of orebody). This solution has a pH of 9.6, or slightly in excess thereof, and leaches out far more carbonaceous material than does the solution of pH 9.3, already referred to.

Despite the filtration, through a slime coating or other filter aid material, that the pregnant solutions from both the flooding and pressure-leaching steps are subjected to, each emerges contaminated with carbonaceous material to a substantial degree. The pregnant solution from the pressure-leaching step is of course far more contaminated, because of the acceleration of solution of carbonaceous material in that step, as opposed to the suppression thereof in the flooding step.

I have discovered that when uranium ore is leached (whether or not in situ) with $Na_2CO_3$ in the presence of carbonaceous material, so that carbonaceous material is drawn into the leaching solution, it is impossible to precipitate sodium uranate satisfactorily upon the addition of NaOH. On the contrary, a colloidal solution is apparently formed, in which the uranium in solution is evidently associated in some manner with the carbonaceous material. Further, the stability of this colloidal suspension is increased by increased pH. Thus addition of NaOH, instead of precipitating out the uranium, promotes its remaining in solution.

Accordingly, it is essential that substantially all carbonaceous material be removed from the pregnant solutions before treatment with NaOH. This I accomplish by "polishing" them—passing them through beds of activated alumina until the carbonaceous material is sufficiently removed that on the addition of NaOH substantially all the uranium present is precipitated. Instead of or in addition to passing them through beds of alumina I may filter them through vacuum filter leaves precoated with activated alumina or any suitable adsorbent or through a pressure filter containing activated alumina. Naturally, it takes much more contact with adsorbent to purify sufficiently the pregnant solution from the pressure-leaching step than to purify the pregnant solution from the flooding step.

As has been mentioned already, the solutions usually pick up magnesium, aluminum, and minor amounts of calcium salts in passing through the bed, and unless these too are removed they precipitate as hydroxides when NaOH is added, and contaminate the uranium product. It is an additional purpose and advantage of the alumina treatments that the cations of magnesium and aluminum, as well as carboniferous material, are removed. Treatment with alumina is continued till the concentration of these mineral impurities, as well as of carbonaceous material is reduced to a suitably low level, as indicated ultimately by the quality of the product produced upon addition of NaOH.

The alumina is regenerated as necessary, by roasting. This removes the carbonaceous material, but of course not the calcium, magnesium, or aluminum adsorbed. These slowly build up on the alumina and ultimately poison it. This is one reason that it is important to remove the impurities of this character initially present in the fresh water, by pre-treatment, so as to minimize the quantities that must be removed by adsorption and ion exchange.

To the polished and clarified solutions I then add NaOH, to precipitate uranium as sodium uranate ($Na_2U_2O_7$). It will be apparent that any $NaHCO_3$ in the solution is converted to $Na_2CO_3$ by the NaOH added.

I have discovered that precipitation of $Na_2U_2O_7$ is optimum if NaOH is added until a maximum pH is reached, which will take place at a pH of about 10.4, and thereafter no further NaOH is added. Sodium uranate is precipitated as a yellow, granular powder. Adding NaOH after this maximum pH is reached depresses the pH of the solution somewhat, and results in a decreased rate of precipitation of $Na_2U_2O_7$.

I remove vanadium from the resultant solutions by an ion exchange process well known in the art, to which I make no claim.

I then treat the remaining, barren solution to prepare it for use in further leaching. I have already pointed out that the addition of NaOH in the precipitation step converted all the $NaHCO_3$ in the solution to $Na_2CO_3$. It also left some NaOH in the solution. The NaOH present is eliminated, and the required strength of $NaHCO_3$ is obtained by regenerating this barren solution with $CO_2$, according to the following reactions:

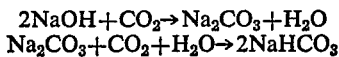

$$2NaOH + CO_2 \rightarrow Na_2CO_3 + H_2O$$
$$Na_2CO_3 + CO_2 + H_2O \rightarrow 2NaHCO_3$$

Regeneration of barren solution can be accomplished also by adding $NaHCO_3$ slightly in excess of that necessary to complete the following reaction with NaOH:

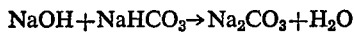

$$NaOH + NaHCO_3 \rightarrow Na_2CO_3 + H_2O$$

It will be understood that my new process is suitable for the in situ mining not only of metals other than uranium and the like, but also of non-metals. For example, it may be used to leach copper from "oxide copper ores" using dilute sulfuric acid, or to leach phosphates from orebodies containing them.

It will also be understood that many modifications, variants, and embodiments of my new process, within the spirit and scope of the appended claims, will readily occur to one skilled in the art.

I claim:

1. The process of leaching minerals from orebodies, in situ, which comprises introducing a solvent for said minerals into an orebody through a first group of holes, passing said solvent through a portion of said orebody until it appears at a second group of holes, reversing the direction of flow by introducing further of said solvent into said orebody through said second group of holes and passing it through said portion of said orebody to said first group of holes, and withdrawing the resultant solution from said first group of holes.

2. The process of leaching minerals from orebodies, in situ, which comprises drilling a multiplicity of rows of center holes to an orebody, drilling a multiplicity of peripheral holes around each of said center holes and down to said orebody, introducing a solvent for said minerals into said orebody through said center holes, passing said solvent through said orebody until it appears at the respective said peripheral holes, reversing the direction of flow then by introducing further of said solvent into said orebody through said peripheral holes and passing it back through said orebody to the respective said center holes, and withdrawing the resultant solution from said center holes.

3. The process of claim 2 in which said center holes are drilled to a diameter substantially larger than said peripheral holes.

4. The process of leaching minerals from orebodies, in situ, which comprises first flooding a predetermined portion of orebody to bring a solvent for said minerals into contact with said orebody throughout said predetermined portion thereof, said flooding step being conducted by introducing said solvent into said orebody at a relatively low pressure throughout said flooding step, said pressure being as low as comports practically with bringing said solvent into contact with said orebed, and thereafter pressure-leaching said portion of orebody with additional solvent for said minerals, said pressure-leaching step being conducted by introducing said solvent into said orebody at substantially higher pressure, said higher pressure being less than that at which rock failure would occur.

5. The process of claim 4 in which subsequent to said flooding and said pressure-leaching of said predetermined portion of orebody, other predetermined portions thereof are successively subjected to said two steps.

6. The process of claim 4 in which following said pressure-leaching, said portion of orebody is washed with fluid non-solvent.

7. The process of leaching minerals from orebodies, in situ, which includes the steps of introducing a first increment of solvent for said minerals into an orebody at a first hole, passing said first increment through a portion of said orebody to a second hole, introducing a second increment of solvent for said minerals at said second hole, and driving said second increment through said portion of said orebody from said second hole to said first hole.

8. In a process for in situ mining, the step which consists of washing down solution lifted above the orebody by capillary action by filling wells with washing fluid to a level above that from which said solution has been lifted by capillary action.

References Cited in the file of this patent

UNITED STATES PATENTS

| | | |
|---|---|---|
| 565,342 | Frasch | Aug. 4, 1896 |
| 672,475 | Cavallaro | Apr. 23, 1901 |
| 975,106 | Austin | Nov. 8, 1910 |
| 1,028,774 | Perret | June 4, 1912 |
| 1,076,833 | Laist | Oct. 28, 1913 |
| 1,399,554 | Hamilton | Dec. 6, 1921 |
| 1,747,403 | Tilley | Feb. 18, 1930 |
| 1,787,973 | Doherty | Jan. 6, 1931 |
| 1,891,532 | Gibson | Dec. 20, 1932 |
| 2,291,911 | McMahon | Aug. 4, 1942 |
| 2,347,778 | Heath | May 2, 1944 |
| 2,563,623 | Scott | Aug. 7, 1951 |
| 2,630,369 | Burwell | Mar. 3, 1953 |

FOREIGN PATENTS

| | | |
|---|---|---|
| 135,722 | Germany | July 8, 1900 |
| 5,867 | Great Britain | of 1911 |
| 296,813 | Great Britain | Sept. 10, 1928 |

OTHER REFERENCES

Handbook of Nonferrous Metallurgy, Recovery of Metals, by Liddel, pp. 616–621, published by McGraw-Hill Book Co., Inc., New York, in 1945.